United States Patent
Ishimura

(10) Patent No.: US 11,225,114 B2
(45) Date of Patent: Jan. 18, 2022

(54) CONVEYING DEVICE

(71) Applicant: SHARP KABUSHIKI KAISHA, Osaka (JP)

(72) Inventor: Ryoji Ishimura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 443 days.

(21) Appl. No.: 16/504,160

(22) Filed: Jul. 5, 2019

(65) Prior Publication Data

US 2020/0016945 A1 Jan. 16, 2020

(30) Foreign Application Priority Data

Jul. 12, 2018 (JP) .............................. JP2018-132172

(51) Int. Cl.
*B60D 1/00* (2006.01)
*B60D 1/01* (2006.01)

(52) U.S. Cl.
CPC .......... *B60D 1/01* (2013.01); *B60D 2001/005* (2013.01)

(58) Field of Classification Search
CPC ...... B60D 2001/005; B60D 1/01; B60D 1/04; B60D 1/36; B65G 47/652
See application file for complete search history.

(56) References Cited

U.S. PATENT DOCUMENTS

| 10,532,895 | B1* | 1/2020 | Best | B65G 17/345 |
| 2005/0206106 | A1* | 9/2005 | Labadie | B60D 1/44 |
| | | | | 280/79.11 |
| 2019/0061446 | A1* | 2/2019 | Fujihara | B60D 1/1675 |
| 2019/0202249 | A1* | 7/2019 | Adachi | B60D 1/62 |
| 2019/0381843 | A1* | 12/2019 | Miyamoto | B60D 1/36 |
| 2020/0016945 | A1* | 1/2020 | Ishimura | B60D 1/00 |
| 2020/0017296 | A1* | 1/2020 | Ishimura | B65G 1/04 |
| 2020/0223631 | A1* | 7/2020 | Azumi | B66F 9/063 |

FOREIGN PATENT DOCUMENTS

JP 2016-150691 A 8/2016

* cited by examiner

*Primary Examiner* — Kaitlin S Joerger
(74) *Attorney, Agent, or Firm* — ScienBiziP, P.C.

(57) ABSTRACT

A conveying device according to the present invention includes a first connection mechanism provided on an upper surface, a base member provided on the upper surface, a sliding mechanism that relatively and slidably moves the position of the first connection mechanism relative to the base member on the slide axis, and a traveling mechanism that makes the conveying device travel. The first connection mechanism has an over-riding portion provided on the slide axis, and a connection part connected with the object to be conveyed. The over-riding portion is in an over-riding state of over-riding an upper surface of the base member when the sliding mechanism slidably moves the position of the first connection mechanism relative to the base member. The connection part performs a lifting operation to be connected with the object to be conveyed when the over-riding portion is in the over-riding state.

12 Claims, 18 Drawing Sheets

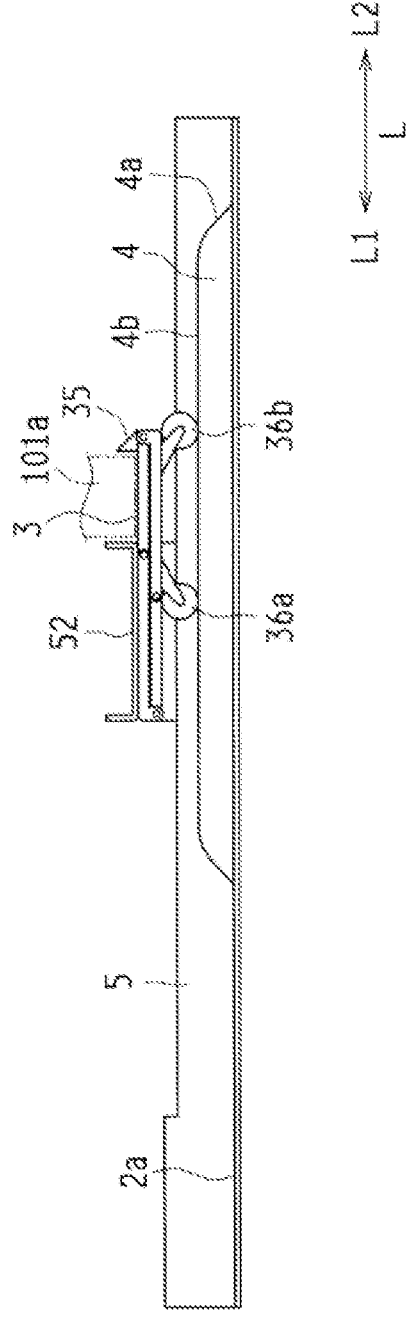
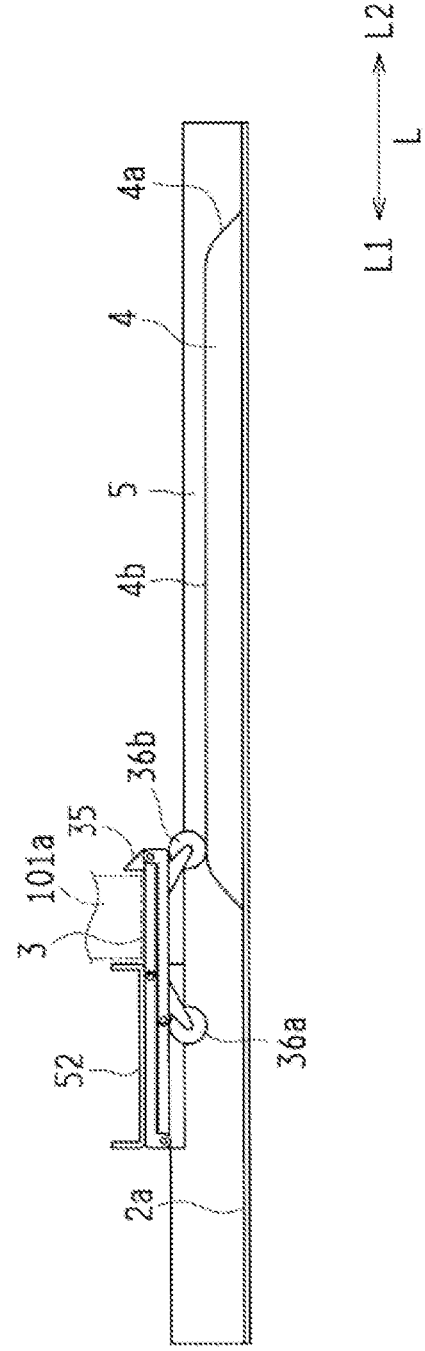

CONVEYING DEVICE

BACKGROUND OF THE INVENTION

Field of the Invention

The present invention relates to a conveying device that conveys a connected object to be conveyed.

Description of the Background Art

Conventionally, carriages for loading luggage have been widely used, and recently, an automatic carrier for conveying a carriage has been developed. The automatic carrier is connected with the carriage, and numerous forms of the automatic carrier have been proposed in accordance with the configuration of the carriage. Moreover, the automatic carrier containing a short tow car is known as a form which slides under the carriage (for example, refer to Japanese Unexamined Patent Application Publication No. 2016-150691).

The automatic carrier described in Japanese Unexamined Patent Application Publication No. 2016-150691 is a combination of a conveyance carriage having universal wheels (casters) and a tow car which slides under the conveyance carriage to be connected with the conveyance carriage. The tow car is biased by a biasing means and has two connection pins connected with the conveyance carriage, and the conveyance carriage is provided with two connection holes accommodating the two connection pins.

In the aforementioned automatic carrier, a lifting motor is employed as a mechanism for lifting and lowering the connection pins, and therefore, there are some problems. In short, the connection pins are raised and lowered (vertically), thus, a stroke to vertically move is necessary, and the vertical dimensions (height) of the tow car become large. There is a problem that in the method in which the tow car slides under the conveyance carriage, the height of the tow car is limited and the configuration is restricted. Further, there is a problem that a deviation in the weight occurs, thus, it is difficult to provide a heavy lifting motor at the edge of the tow car. Therefore, the configuration in which the connection pins are accommodated in the tow car must be employed.

The present invention has been made to solve the above problems and the object thereof is to provide a conveying device which can realize the operation by which the conveying device is connected with a carriage without providing a lifting device in a connection mechanism itself.

SUMMARY OF THE INVENTION

The conveying device according to the present invention conveys a connected object to be conveyed, and includes: a first connection mechanism provided on an upper surface of the conveying device; a base member provided on the upper surface of the conveying device; a sliding mechanism that relatively and slidably moves a position of the first connection mechanism relative to the base member on a predetermined slide axis; and a traveling mechanism that makes the conveying device travel, wherein the first connection mechanism has an over-riding portion provided on the slide axis, and a connection part connected with the object to be conveyed, the over-riding portion is in an over-riding state of over-riding an upper surface of the base member when the sliding mechanism slidably moves the position of the first connection mechanism relative to the base member, and the connection part performs a lifting operation to be connected with the object to be conveyed when the over-riding portion is in the over-riding state.

The conveying device according to the present invention may be configured so that the base member has a guide portion having a tapered shape, at an end of a side facing the over-riding portion on the slide axis.

The conveying device according to the present invention may be configured so that the base member has a sliding portion having a flat shape in a center portion, on the slide axis, of the upper surface.

The conveying device according to the present invention may be configured so that the sliding mechanism includes a first slide portion that slidably moves the first connection mechanism on the slide axis.

The conveying device according to the present invention may be configured so that the first connection mechanism is connected with the object to be conveyed at a predetermined connection position, and the first slide portion slidably moves the first connection mechanism between the connection position and a conveyance position spaced away from the connection position on the slide axis, in a state in which the first connection mechanism is connected with the object to be conveyed.

The conveying device according to the present invention may be configured so that the traveling mechanism makes the conveying device travel in a state in which the first connection mechanism is positioned in the conveyance position.

The conveying device according to the present invention may be configured so that when the first connection mechanism is positioned in the connection position, the center of the conveying device is positioned outside an area directly below a bottom surface of the object to be conveyed, and when the first connection mechanism is positioned in the conveyance position, the center of the conveying device is positioned within the area directly below the bottom surface of the object to be conveyed.

The conveying device according to the present invention may include a second connection mechanism connected with the object to be conveyed in a state in which the first connection mechanism is positioned in the conveyance position.

The conveying device according to the present invention may be configured so that the sliding mechanism includes a second slide portion that slidably moves the base member on the slide axis.

The conveying device according to the present invention may be configured so that the over-riding portion over-rides the upper surface of the base member when the base member is slidably moved on the slide axis.

The conveying device according to the present invention may be configured so that the over-riding portion has a friction reduction mechanism that reduces friction between the over-riding portion and the upper surface of the base member when over-riding the upper surface of the base member.

The conveying device according to the present invention may be configured so that the connection part includes a rotating portion which rotates around a fulcrum, and an engagement portion provided spaced away from the rotating portion and protruding upward, and the rotating portion rotates upward and engages the engagement portion with a part of a bottom surface of the object to be conveyed when the over-riding portion over-rides the upper surface of the base member.

According to the present invention, by configuring so that the positional relationship between the first connection mechanism and the base member is moved, it is possible to realize the operation for connecting to the carriage by raising the first connection mechanism without providing the lifting device in the first connection mechanism itself.

BRIEF DESCRIPTION OF THE DRAWINGS

FIG. 12C is an explanatory view illustrating the state in which the first connection mechanism is towing the connected part;

FIG. 12D is an explanatory view illustrating the state in which the first connection mechanism in the conveyance position is connected with the connected part;

DESCRIPTION OF THE PREFERRED EMBODIMENTS

First Embodiment

Hereinafter, the conveying device according to the first embodiment of the present invention will be described with reference to the drawings.

Figure 1:
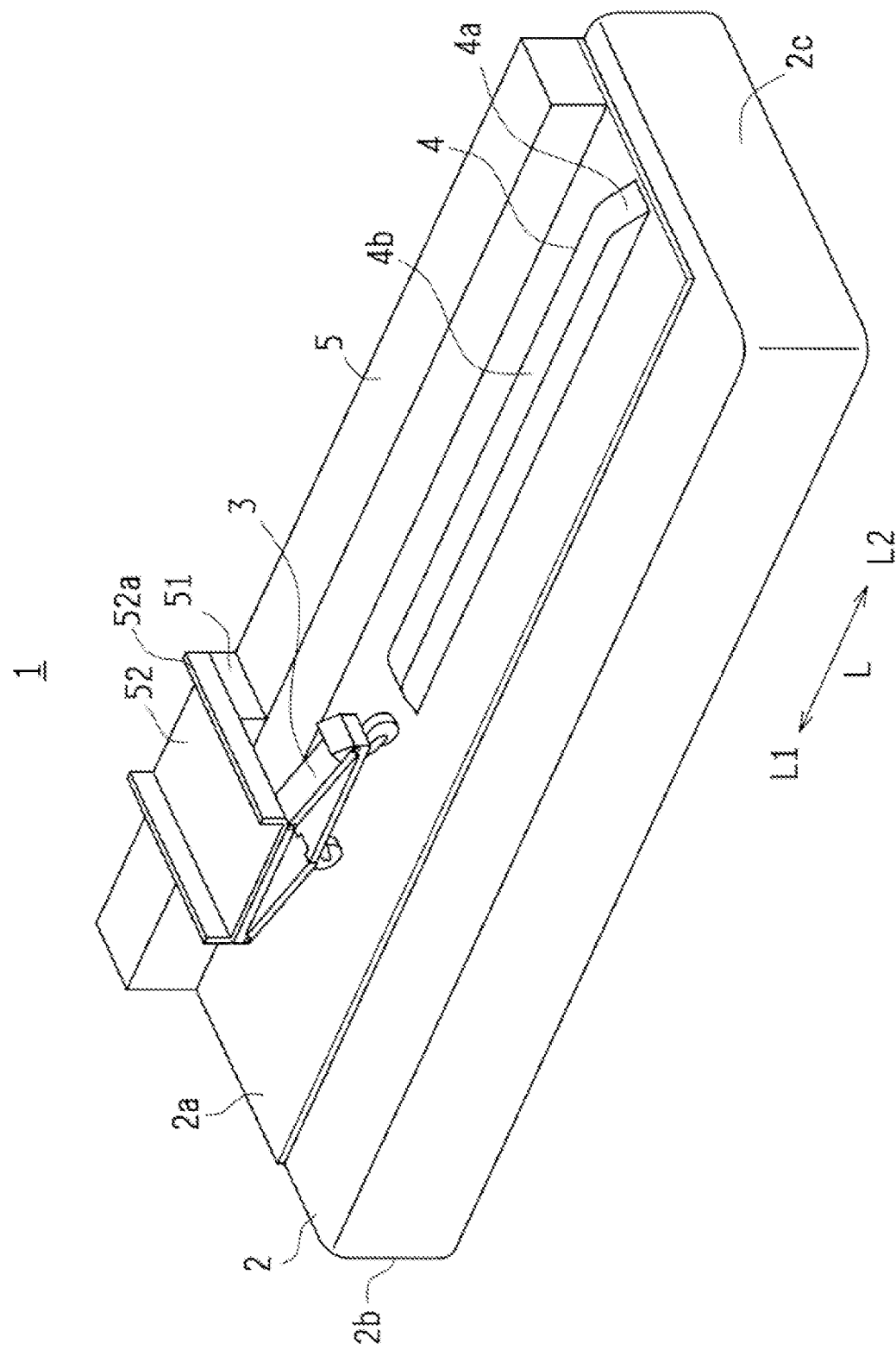
FIG. 1 is a schematic perspective view of a conveying device according to a first embodiment of the present invention.
Figure 2:
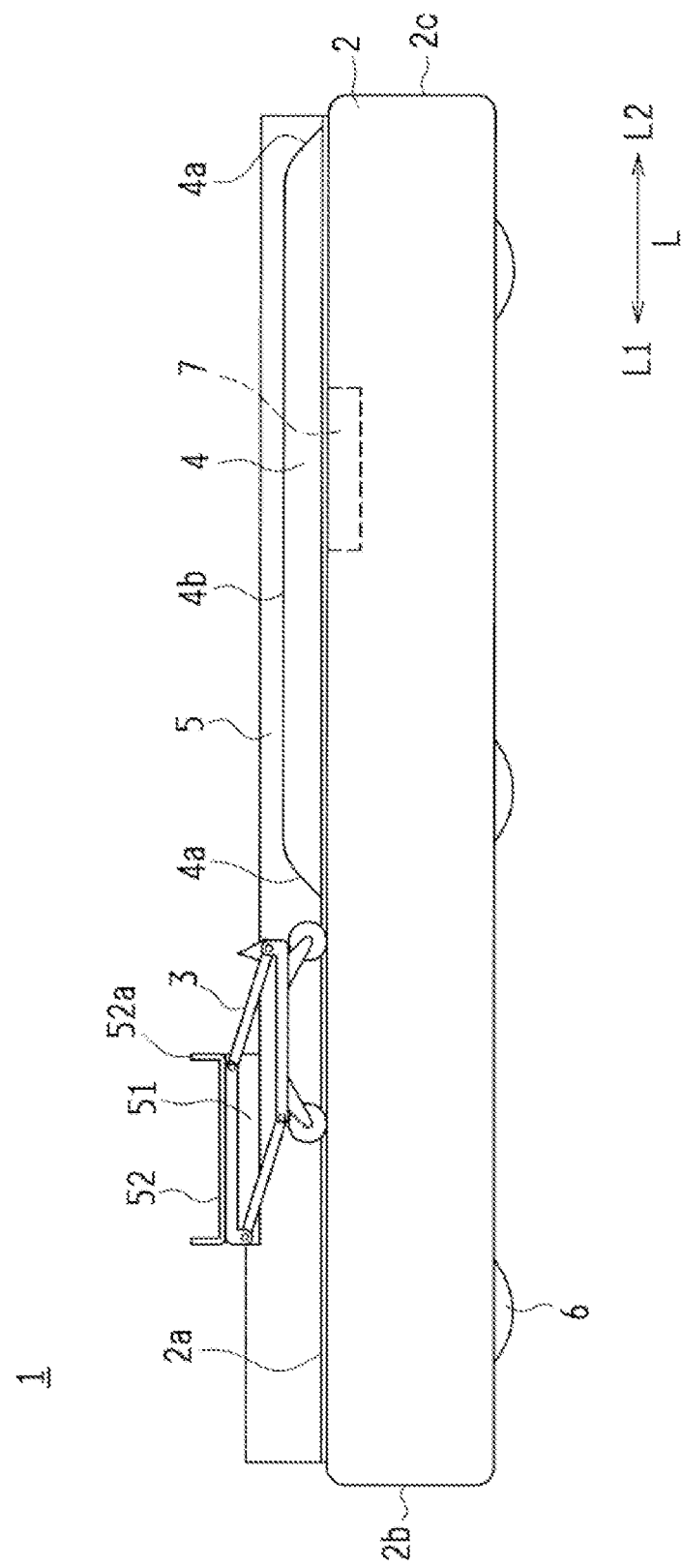
FIG. 2 is a schematic side surface view of the conveying device shown in FIG.
Figure 3:
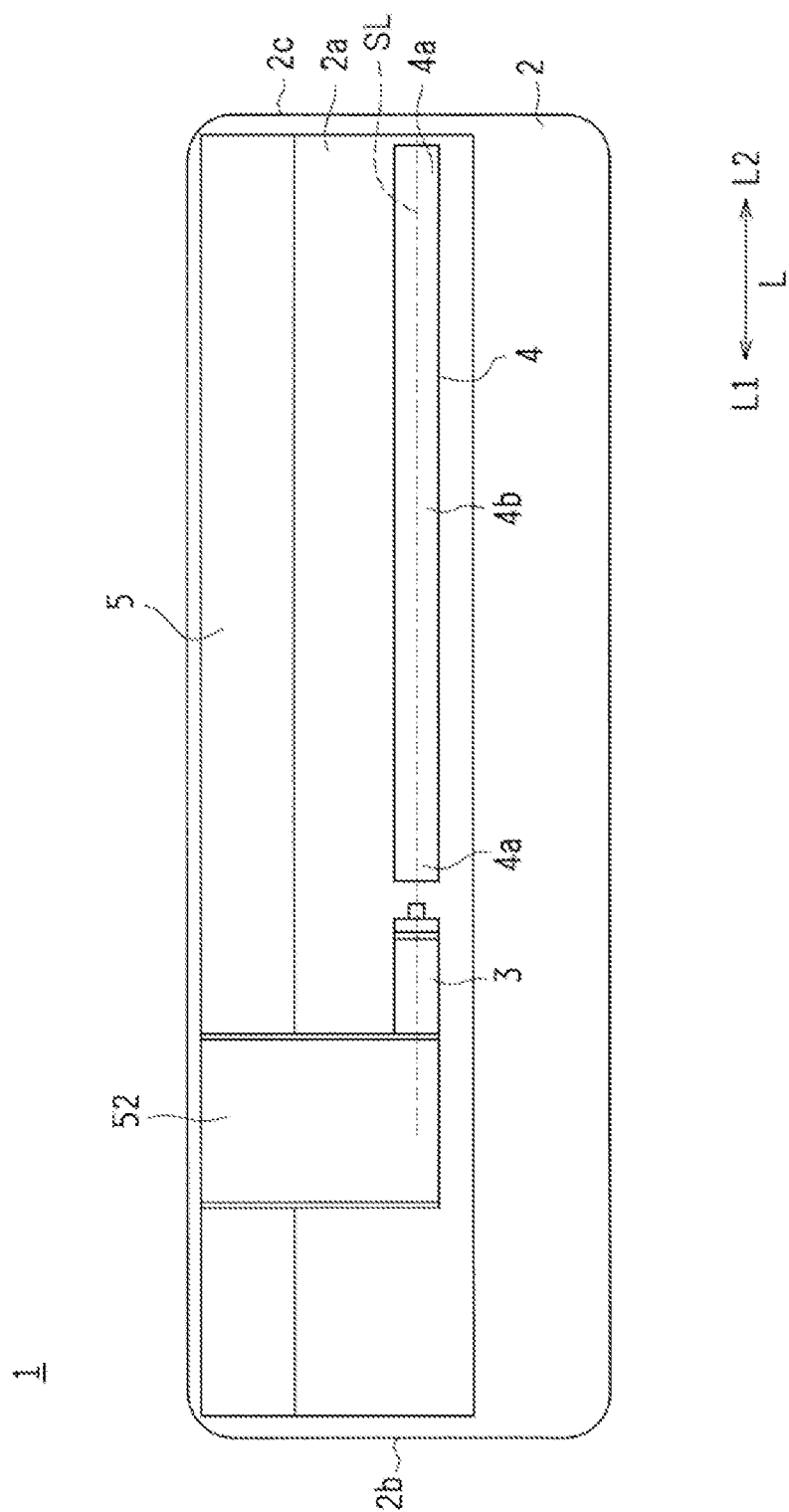
FIG. 3 is a schematic upper surface view of the conveying device shown in FIG. 1.

FIG. 1 is a schematic perspective view of a conveying device according to a first embodiment of the present invention, FIG. 2 is a schematic side surface view of the conveying device shown in FIG. 1, and FIG. 3 is a schematic upper surface view of the conveying device shown in FIG. 1.

A conveying device 1 according to the first embodiment of the present invention has a travel casing 2 which stores the traveling mechanism, and the travel casing 2 has a lower height than the bottom surface of a carriage 100 (an example of the object to be conveyed, refer to FIG. 7 which is described later) which is described later and has an elongated rectangular shape. A first connection mechanism 3 and a base member 4 are provided in an upper surface (reference surface 2a) of the travel casing 2. A plurality of grounded wheels 6 are provided in the bottom part of the travel casing 2 as a part of the traveling mechanism. The travel casing 2 is configured to travel by the traveling mechanism and proceed back and forth along its own longitudinal direction L, and appropriately turns to change the direction to the left or the right. Note that, the following is for explanation; one direction (in FIG. 2, the leftward direction) of the longitudinal direction L of the travel casing 2 is referred to as a first longitudinal direction L1, and the other direction (in FIG. 2, the rightward direction) is referred to as a second longitudinal direction L2. Further, in the travel casing 2, the side surface of the first longitudinal direction L1 side of the side surface facing longitudinal direction L is referred to as a first side surface 2b, and the side surface of the second longitudinal direction L2 side is referred to as a second side surface 2c.

A first slide portion 5 is provided along one of the long sides (in FIG. 3, the upper side) in the reference surface 2a. The first slide portion 5 is a cylinder, and moves a first connecting passage part 51 attached to the upper portion in a longitudinal direction L. A substantially flat second connecting passage part 52 is attached to the first connecting passage part 51. The second connecting passage part 52 extends to the other long side (in FIG. 3, the lower side) of the reference surface 2a side, and the first connection mechanism 3 is attached to the bottom portion of an extended tip. Further, the second connecting passage part 52 provides a standing portion 52a standing upwards in the end portion of the second longitudinal direction L2 side.

In the present embodiment, the first connection mechanism 3 is formed as a four-node link mechanism. Note that, the first connection mechanism 3 will be described in detail with reference to FIG. 5 and FIG. 6 which are described later. As stated above, the first connecting passage part 51 and the second connecting passage part 52 are configured to move in the longitudinal direction L by the first slide portion 5, and as the second connecting passage part 52 moves, the first connection mechanism 3 also moves in the longitudinal direction L. In FIG. 3, in the upper surface view, the trajectory when the first connection mechanism 3 moves in the longitudinal direction L is shown as a slide axis SL. The range of movement of the first connection mechanism 3 is from a position closer to the first side surface 2b than the center of the conveying device 1 to the vicinity of the second side surface 2c.

The base member 4 is provided in a position overlapping with the slide axis SL in the upper surface view, and the length in the longitudinal direction L is assumed to be a little shorter than the range of movement of the first connection mechanism 3. The upper surface of the base member 4 is positioned above the reference surface 2a, and a guide portion 4a having a tapered shape is provided at each of both end portions of the longitudinal direction L. In short, the base member 4 is formed in a substantially trapezoidal shape in a side surface view (refer to FIG. 2), and the guide portion 4a is assumed to be a surface inclined so the height thereof gradually decreases toward the end. Moreover, the center of the base member 4 has a uniform height and is formed as a sliding portion 4b having a flat shape.

Figure 4:
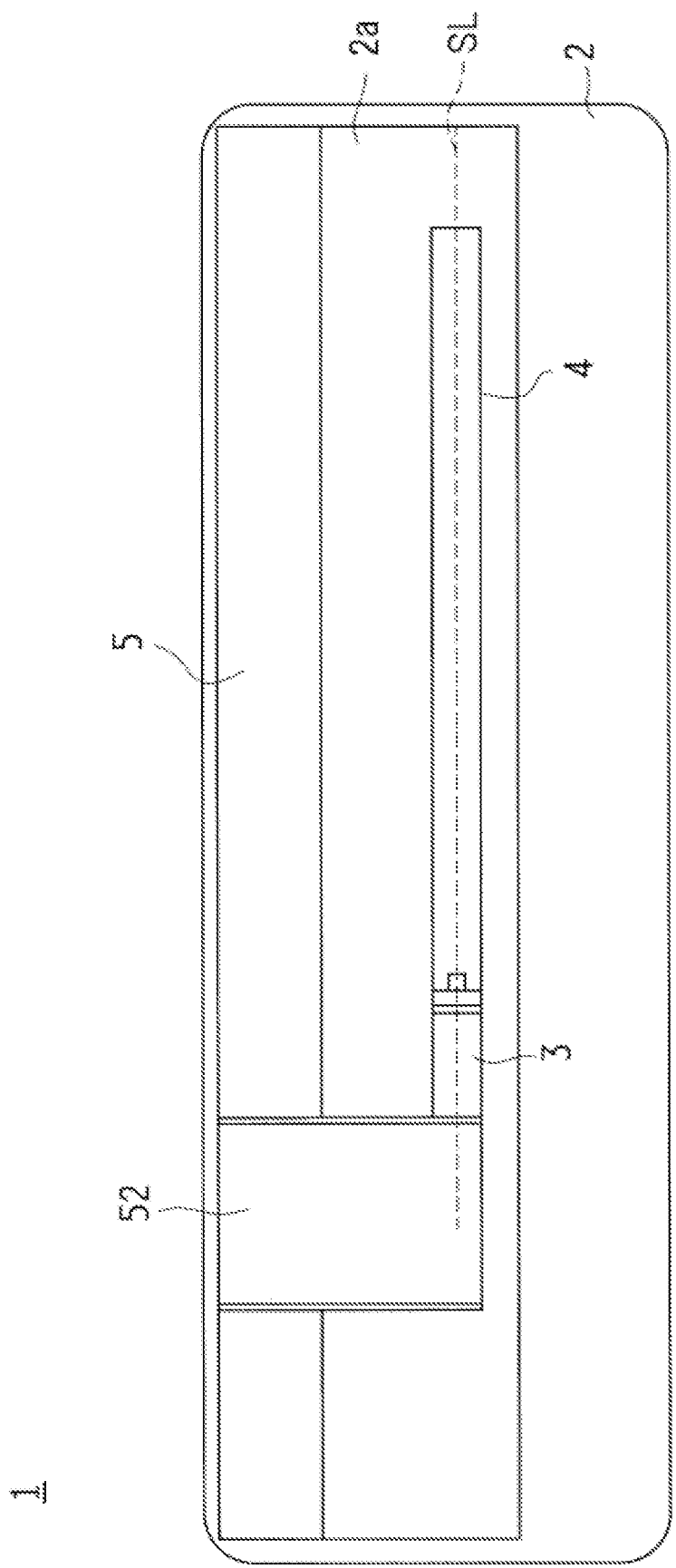
FIG. 4 is a schematic upper surface view illustrating a state in which a base member of the conveying device moved.

FIG. 1 to FIG. 3 illustrate the state in which the first connection mechanism 3 is moved in the first longitudinal direction L1, and the first connection mechanism 3 and the base member 4 are not in contact. A second slide portion 7 may be attached to the base member 4 to move itself in the longitudinal direction L. When the base member 4 moves in the first longitudinal direction L1, as shown in FIG. 4, the first connection mechanism 3 abuts against the base member 4, and is guided to the guide portion 4a to over-ride above the base member 4. Note that, the configuration which moves the base member 4 will be described in detail in the second embodiment which will be described later.

Figure 5:
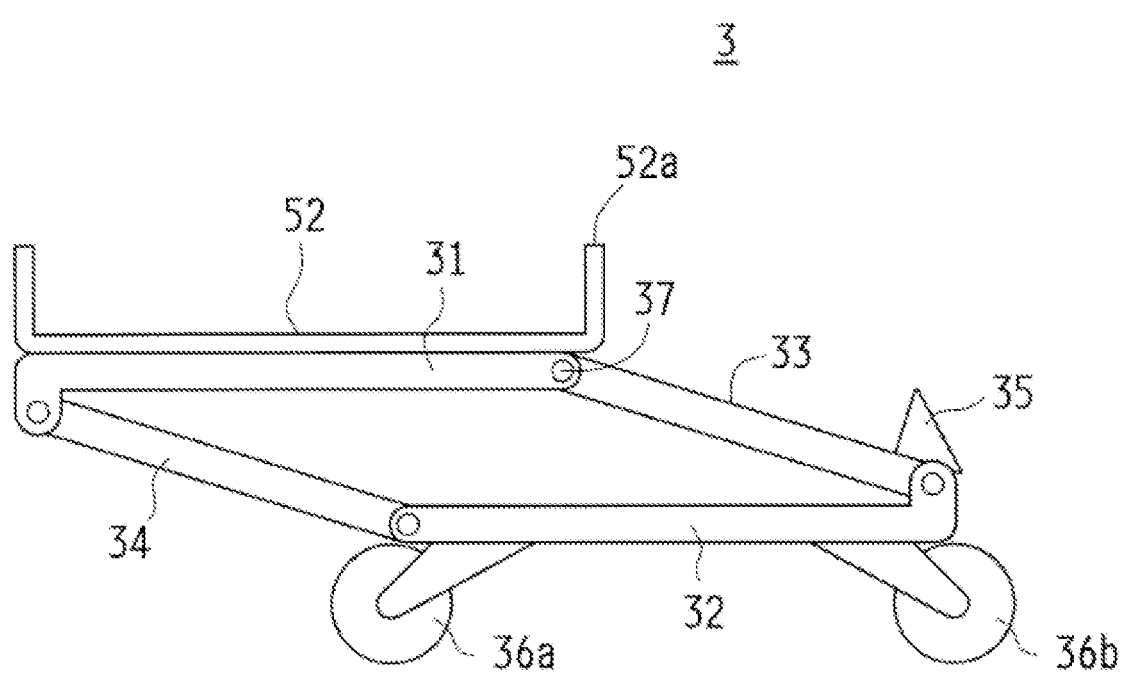
FIG. 5 is an expanded side surface view extracting and illustrating the vicinity of the expanded first connection mechanism.
Figure 6:
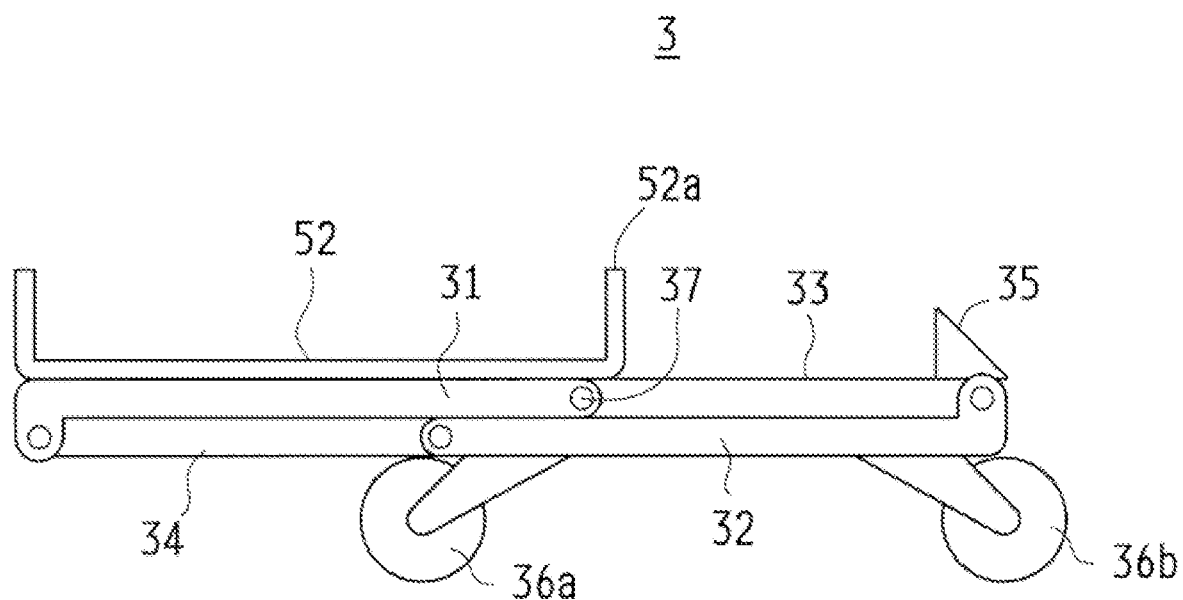
FIG. 6 is an expanded side surface view illustrating the over-riding state of the first connection mechanism shown in FIG. 5.

FIG. 5 is an expanded side surface view extracting and illustrating the vicinity of the expanded first connection mechanism, and FIG. 6 is an expanded side surface view illustrating the over-riding state of the first connection mechanism shown in FIG. 5.

In the present embodiment, the first connection mechanism 3 is constituted by a first opposing piece 31, a second opposing piece 32, a first rotating piece 33, a second rotating piece 34, an engagement portion 35, a first over-riding wheel 36a, and a second over-riding wheel 36b.

The first opposing piece 31, the second opposing piece 32, the first rotating piece 33, and the second rotating piece 34 are connected at the ends to form a link mechanism. Specifically, the first opposing piece 31 is fixed to the lower surface of the second connecting passage part 52, and one end thereof (on the second side surface 2c side) is connected with the first rotating piece 33 and the other end thereof (on the first side surface 2b side) is connected with the second rotating piece 34. The first rotating piece 33 is configured to rotate around a fulcrum 37 connected with the first opposing piece 31, and the end opposite the fulcrum 37 is connected with the second opposing piece 32. Further, the first rotating piece 33 provides the engagement portion 35 protruding upward to the upper surface (outer surface side of the link mechanism) of the end connected with the second opposing piece 32. One end (on the second side surface 2c side) of the first opposing piece 31 is connected with the first rotating piece 33 and the other end thereof (on the first side surface 2b side) is connected with the second rotating piece 34. Moreover, on the lower surface of the second opposing piece 32, the first over-riding wheel 36a is provided at the end of the second rotating piece 34 side and the second over-riding wheel 36b is provided at the end of the first rotating piece 33 side.

In the first connection mechanism 3, the upper portion (specifically, the first opposing piece 31) is fixed, whereas the lower portion (specifically, the first over-riding wheel 36a and the second over-riding wheel 36b) is assumed to only be in contact with the reference surface 2a and the like. Therefore, when the positional relationship is moved relative to each other so that the first connection mechanism 3 is in contact with the base member 4, the first over-riding wheel 36a and the second over-riding wheel 36b (an example of the over-riding portion) is pushed upwards by the base member 4 as shown in FIG. 6. Moreover, if either of the first over-riding wheel 36a or the second over-riding Wheel 36b is pushed, the second opposing piece 32 moves upward, and the first rotating piece 33 rotates upward on the engagement portion 35 side around the fulcrum 37. In this case, the first connection mechanism 3 is assumed to be the link mechanism, thus, the second rotating piece 34 operates following the first rotating piece 33.

In the first connection mechanism 3, when the lower portion is in contact with the reference surface 2a, the upper edge of the engagement portion 35 is set to be lower than the second connecting passage part 52 (the standing portion 52a). Moreover, in the over-riding state in which the first connection mechanism 3 over-rides the upper surface of the base member 4, the engagement portion 35 and the standing portion 52a have substantially the same height. Note that, the following is for explanation; as shown in FIG. 5, the state in Which the first connection mechanism 3 is not over-riding on the upper surface of the base member 4, in short, the state in which the lower portion of the first connection mechanism 3 is in contact with the reference surface 2a is referred to as the lower state.

In the present embodiment, the first opposing piece 31, the second opposing piece 32, the first rotating piece 33, and the second rotating piece 34 correspond to the connection parts, specifically, the first rotating piece 33 corresponds to the rotating portion. Further, in the present embodiment, the first over-riding wheel 36a and the second over-riding wheel 36b, which are rollers, are used as the over-riding portion, but it is not limited thereto, and the over-riding portion may be the friction reduction mechanism which reduces the friction between the over-riding portion and the upper surface of the base member 4. The friction reduction mechanism may, for example, make the area of the ground smaller by bending the ground portion, or the ground portion may be made of a slippery material and the like.

Figure 7:
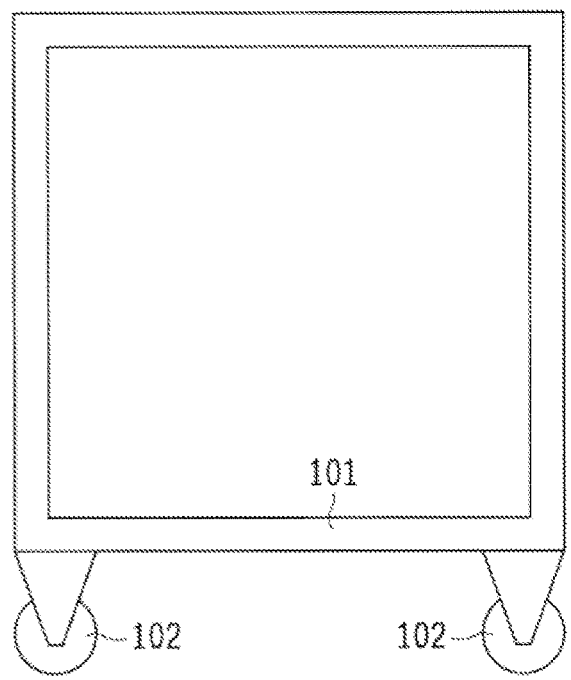
FIG. 7 is a schematic side surface view of a carriage conveyed to the conveying device.
Figure 8:
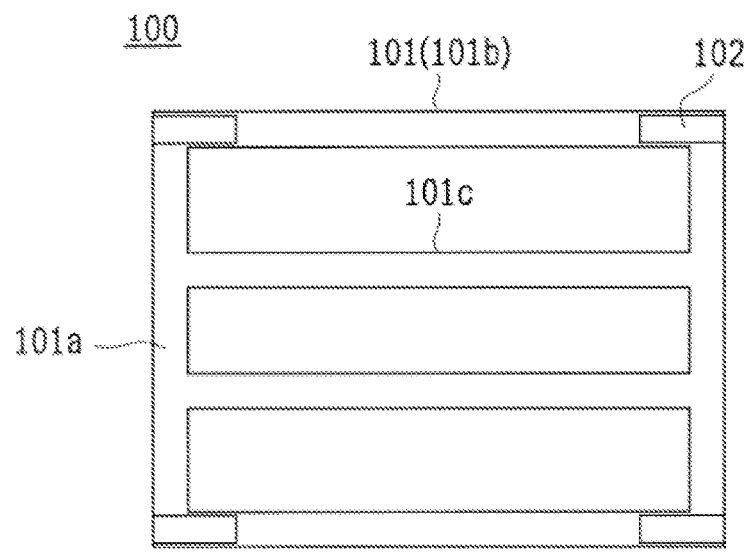
FIG. 8 is a schematic lower surface view of the carriage shown in FIG. 7.

FIG. 7 is a schematic side surface view of the carriage conveyed to the conveying device, and FIG. 8 is a schematic lower surface view of the carriage shown in FIG. 7.

The carriage 100 is constituted by a frame 101 which constitutes a bottom surface on which cargo is loaded and side surfaces, and carriage wheels 102 attached to the lower portion of the frame 101. The bottom surface of the carriage 100 is formed into a rectangular shape by the frame 101, and the carriage wheels 102 are respectively attached to the four corners of the bottom surface. In the frame 101, the bottom surface of the carriage 100 is configured by a combination of rod-like members, and has an outer frame 101b provided along an outer edge of the bottom surface, and a reinforcement portion 101c laid between the opposing outer frames. Note that, the position and the number of the reinforcement portions 101c may be appropriately adjusted, a plurality of members may be disposed in parallel, and the plurality of members may be disposed in grid shape. The conveying device 1 may be connected with a part of the outer frame 101b (connected part 101a).

The carriage 100 should have at least the bottom surface, and the configuration of the side surfaces and the upper surface is not specifically limited. In short, the side surface and the upper surface may be covered with a plate-like member, and the surface for loading the cargo may be increased by partitioning at positions higher than the bottom surface.

Next, the operation for connecting the conveying device 1 with the carriage 100 will be explained with reference to FIG. 9 to FIG. 11.

Figure 9:
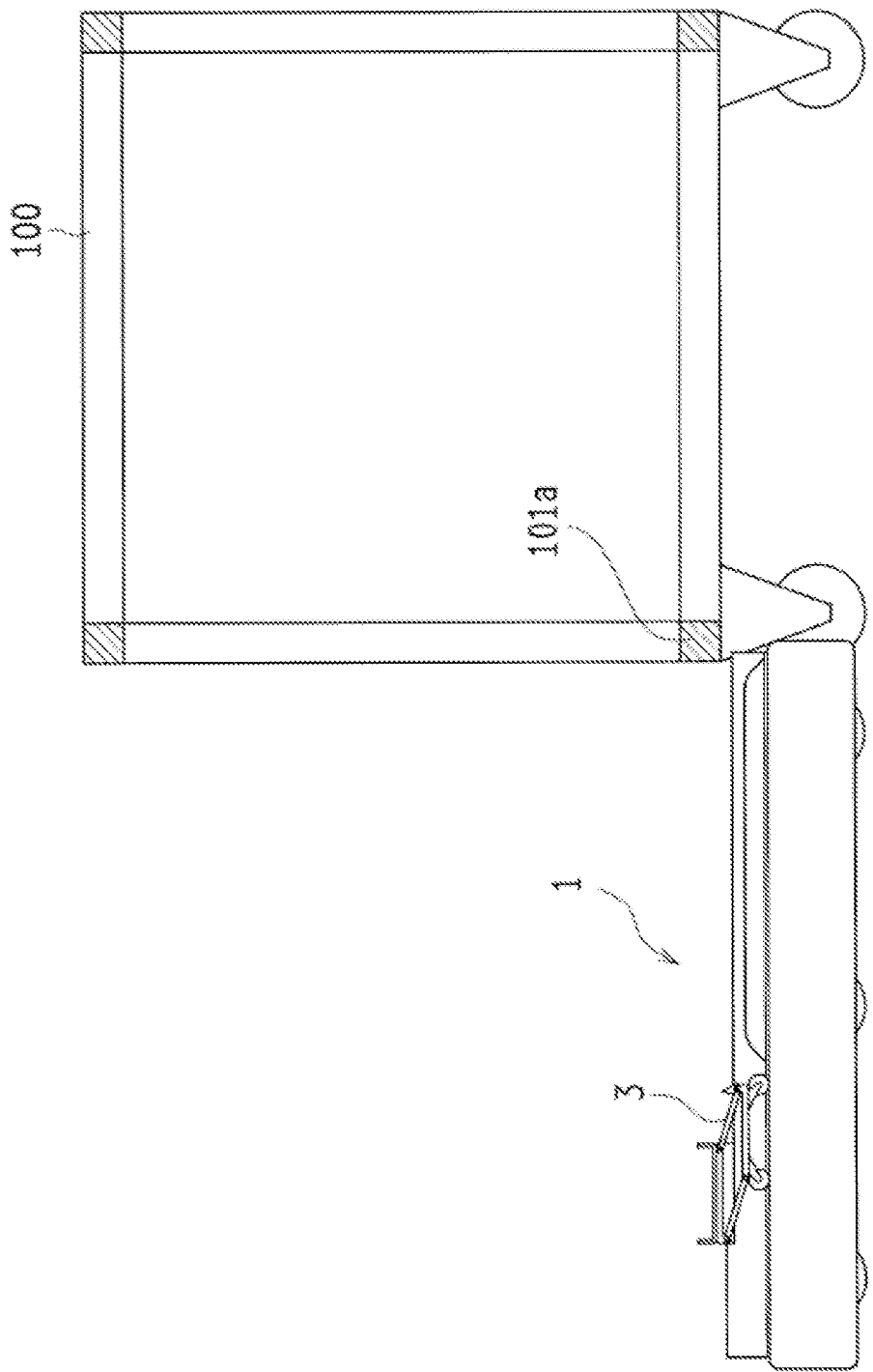
FIG. 9 is an explanatory view illustrating the state in which the conveying device is moved to a location where the conveying device is connected with the carriage.

FIG. 9 is an explanatory view illustrating the state in which the conveying device is moved to a location where the conveying device is connected with the carriage.

In the state in which the connection with the carriage 100 has not been performed, in the conveying device 1, the first connection mechanism 3 moves in the first longitudinal direction L1, and is in a state in Which the first connection mechanism 3 does not over-ride the base member 4. In short, the engagement portion 35 is made as close as possible to the reference surface 2a to prevent the upward protrusion, thus, the risk that the engagement portion 35 becomes stuck due to an object while travelling, etc., is reduced.

The conveying device 1 is configured to receive instructions wirelessly from a server and the like, and automatically moves to the position of the carriage 100 to be conveyed. A predetermined carriage storage space is set for the carriage 100. The conveying device 1 records map information and the position of a plurality of carriage storage spaces in the map. As a method for guiding the conveying device 1, magnetic tape may be placed on the floor. The conveying device 1 reads the magnetic tape information, and is guided along the magnetic tape.

The conveying device 1 moves to the location where the conveying device 1 is connected with the carriage 100 during the guiding process. The conveying device 1 stops the traveling so as to position the second side surface 2c in the vicinity of the outer frame 101b of the carriage 100. In the state shown in FIG. 9, the center of the conveying device 1 is positioned outside of the area directly below the bottom surface of the carriage 100. In short, the conveying device 1 such as the end of the travel casing 2 is positioned under the bottom surface of the carriage 100, but the conveying device 1 does not completely slide between the bottom surface of the carriage 100 and the floor.

Figure 10:
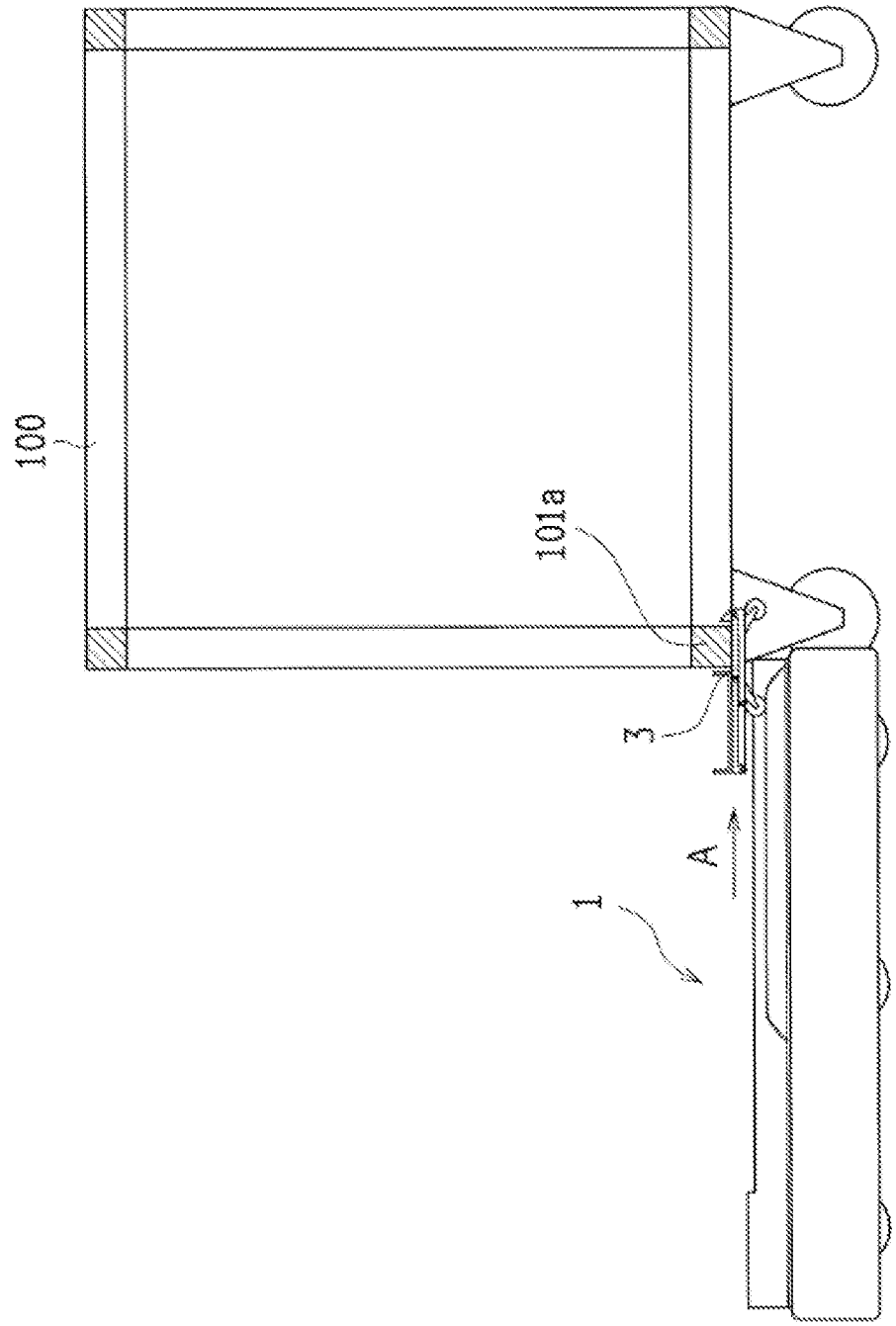
FIG. 10 is an explanatory view illustrating the state in which the first connection mechanism is connected with the carriage.

FIG. 10 is an explanatory view illustrating the state in which the first connection mechanism is connected with the carriage.

In FIG. 10, the state in which the first connection mechanism 3 is moved in the second longitudinal direction L2 is shown relative to FIG. 9. In the first connection process, the first connection mechanism 3 which is moved in the second longitudinal direction L2 (in FIG. 10, the direction of arrow A) is positioned in the vicinity of the second side surface 2c and is connected with the connected part 101a of the carriage 100. Here, the first connection mechanism 3 is in an over-riding state of over-riding the upper surface of the base member 4. Note that, the operation by which the first connection mechanism 3 is connected with the carriage 100 will be described in detail with reference to FIG. 12A to FIG. 12D which will be described later.

Figure 11:
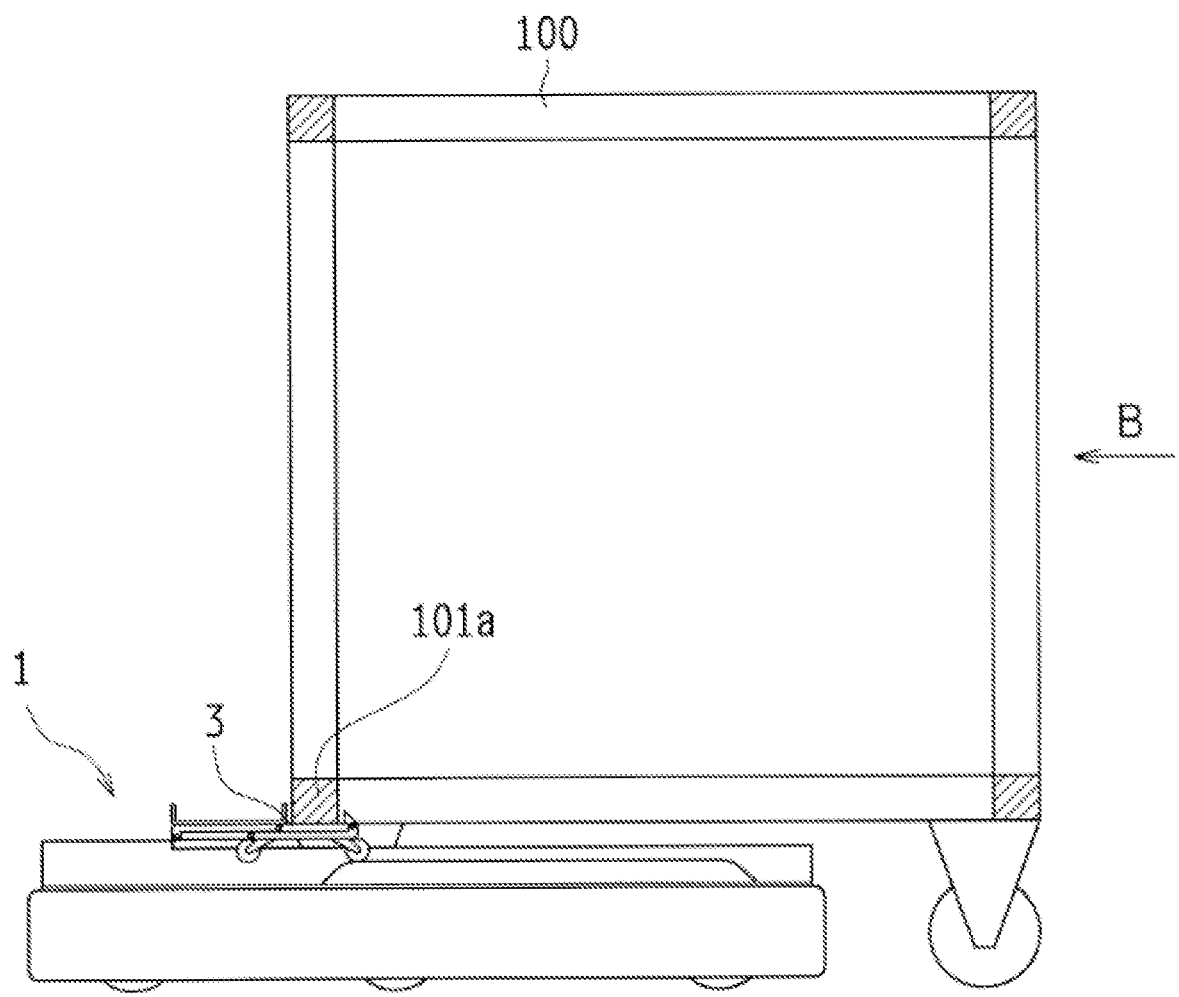
FIG. 11 is an explanatory view illustrating the state in which the first connection mechanism connected with the carriage is slidably moved.

FIG. 11 is an explanatory view illustrating the state in which the first connection mechanism connected with the carriage is slidably moved.

In FIG. 11, the state in which the first connection mechanism 3 is moved in the first longitudinal direction L1 is shown relative to FIG. 10. In the sliding movement process, the first connection mechanism 3 moves in the first longitudinal direction L (in FIG. 11, the direction of arrow B) integrally with the carriage 100 while remaining in the over-riding state. Therefore, the carriage 100 is moved without moving the conveying device 1 itself, and the center of the conveying device 1 is positioned within the area directly below the bottom surface of the carriage 100.

As shown in FIG. 10, in the state in which the conveying device 1 is connected with the carriage 100 without sliding into the lower portion, the total length of the combination of the conveying device 1 and the carriage 100 becomes long, and anxiety occurs in steering and stability during traveling. On the other hand, as shown in FIG. 11, if the conveying device 1 slides to the lower portion of the carriage 100, the conveying device 1 and the carriage 100 are positioned close to each other, whereby the steering and the stability during traveling can be improved.

Next, the operation when the first connection mechanism 3 is slidably moved will be described with reference to FIG. 12A to FIG. 12D. Note that, in FIG. 12A to FIG. 12D, in consideration of the legibility of the drawings, the upper part of the conveying device 1 is mainly extracted from the reference surface 2a.

Figure 12A:
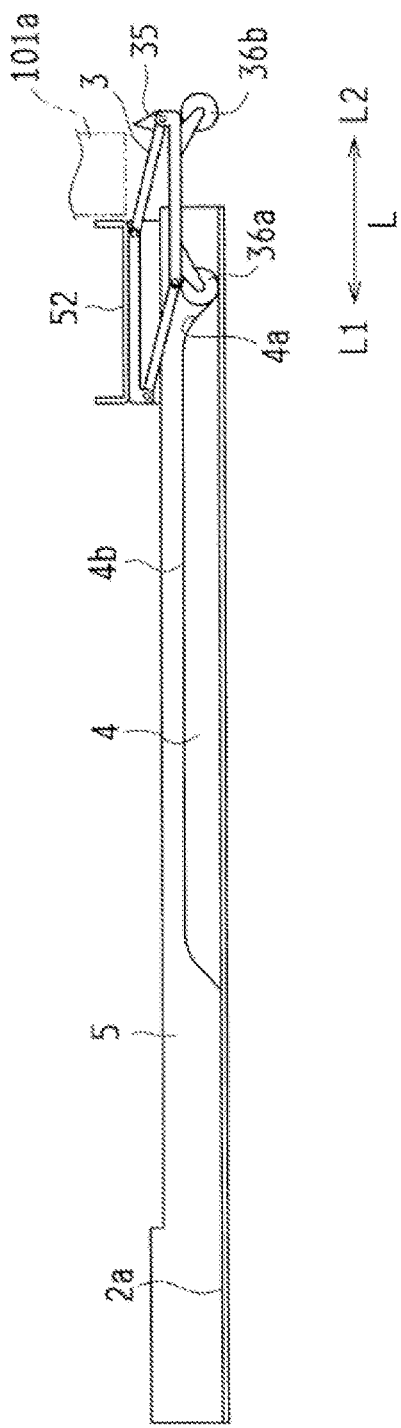
FIG. 12A is an explanatory view illustrating the state in which the first connection mechanism is positioned in the vicinity of the connected part.

FIG. 12A is an explanatory view illustrating the state in which the first connection mechanism is positioned in the vicinity of the connected part.

In FIG. 12A, the first connection mechanism 3 is positioned in the vicinity of the second side surface 2c (in FIG. 12A, the right end), and a part protrudes to the outside from the second side surface 2c. In the state shown in FIG. 12A, the base member 4 is disposed in the position having a gap between the second side surface 2c, and the first connection mechanism 3 is in a lower position in which the lower portion (specifically, the first over-riding wheel 36a) abuts against the reference surface 2a. As a result, the first connection mechanism 3 faces the connected part 101a of the carriage 100, but the engagement portion 35 is lowered, and does not engage with connected part 101a.

Figure 12B:
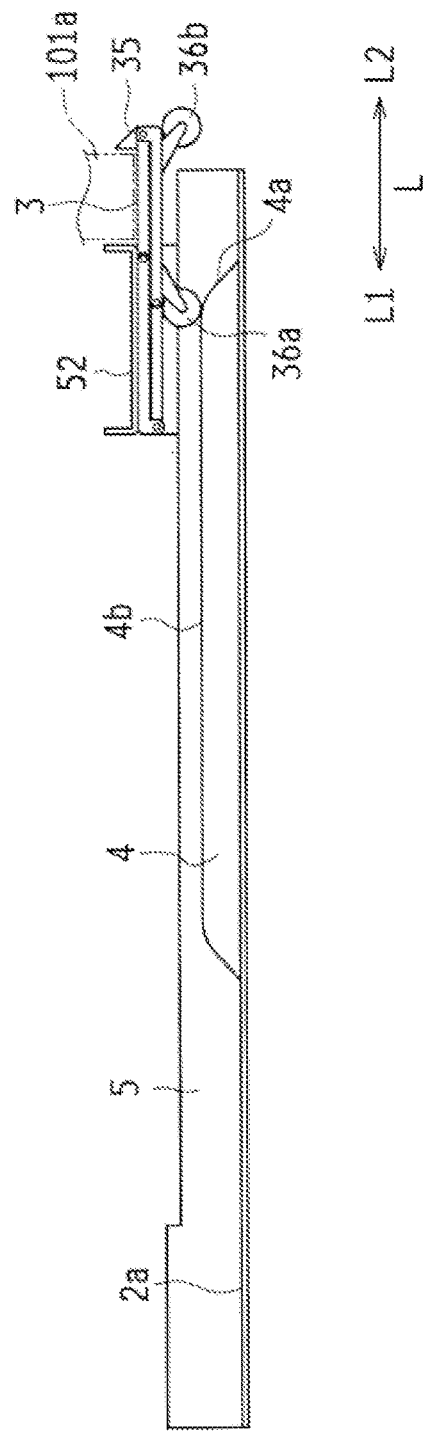
FIG. 12B is an explanatory view illustrating the state in which the first connection mechanism in the connection position is connected with the connected part.

FIG. 12B is an explanatory view illustrating the state in which the first connection mechanism in the connection position is connected with the connected part.

In FIG. 12B, the first connection mechanism 3 is moved to the over-riding state relative to the state shown in FIG. 12A. The first connection mechanism 3 is moved in the first longitudinal direction L1 relative to the base member 4. As a result, the first over-riding wheel 36a is in contact with the sliding portion 4b (the upper surface of the base member 4) through the guide portion 4a. By providing the guide portion 4a, the first over-riding wheel 36a and the second over-riding wheel 36b are smoothly pushed to the base member 4. In the link mechanism which is used in the first connection mechanism 3, even if the second over-riding wheel 36b contacts with the sliding portion 4b, the first over-riding wheel 36a contacts with the sliding portion 4b, and thus, is pushed to the base member 4 via the second opposing piece 32, and the engagement portion 35 is raised to become engaged with the connected part 101a.

When moving the first connection mechanism 3 from the lower state to the over-riding state, the first connection mechanism 3 may move to the first longitudinal direction L1 by the first slide portion 5 while the travel casing 2 may travel to the second longitudinal direction L2 without changing the positional relationship between the connected part 101a (carriage 100) and the first connection mechanism 3. As shown in FIG. 12A and FIG. 12B, the position in which the first connection mechanism 3 faces the connected part 101a in the vicinity of the end of the conveying device 1 is referred to as the connection position.

FIG. 12C is an explanatory view illustrating the state in which the first connection mechanism is towing the connected part.

FIG. 12C illustrates the sliding movement process in which the first connection mechanism 3 slidably moves in the longitudinal direction L integrally with the carriage 100 (the connected part 101a), and with respect to the state shown in FIG. 12B, the first connection mechanism 3 moves in the first longitudinal direction L1. By slidably moving the first connection mechanism 3 in the longitudinal direction L when at least one among the first over-riding wheel 36a and the second over-riding wheel 36b is in an over-riding state relative to the base member 4, the connected part 101a which became stuck between the engagement portion 35 and the standing portion 52a slidably move together with the first connection mechanism 3. The first connection mechanism 3 is in contact with a flat sliding portion 4b, thus, the connection with the carriage 100 is stable.

FIG. 12D is an explanatory view illustrating the state in which the first connection mechanism in the conveyance position is connected with the connected part.

In FIG. 12D, the first connection mechanism 3 is positioned closer to the first side surface 2b (in FIG. 12D, the left end) than the center of the conveying device 1, and the first connection mechanism 3 is further moved in the first longitudinal direction L1 relative to the state shown in FIG. 12C. In FIG. 12D, only the second over-riding wheel 36b is in the over-riding state relative to the base member 4, and the first over-riding wheel 36a is not in contact with the base member 4, but is pushed to the base member 4 via the second opposing piece 32 in the same manner as in FIG. 12B, and the engagement portion 35 is raised to become engaged with the connected part 101a. As shown in FIG. 12D, the position in which the first connection mechanism 3 is slidably moved in a state of being connected with the connected part 101a may be referred to as the conveyance position. The conveyance position is positioned on an opposite side to the connection position with respect to the center of the upper surface of the conveying device 1. In the conveyance process, the conveying device 1 travels in a state in Which the first connection mechanism 3 and the carriage 100 are connected in the conveyance position, and moves integrally with the carriage 100.

Generally, when the lifting device (lifting motor and the like) is provided in the portion to be operated such as the first connection mechanism 3, the size and the weight increase and will become a large-scale structure, thus, the burden on the mechanism to slidably move the first connection mechanism 3 becomes large. In short, it is not desirable to provide a further operating mechanism prior to this operating mechanism. Further, when power is supplied to the lifting device through an electrical cable, the electrical cable slidably moves at the same time, thus, the handling of the cable must be taken in to consideration, and there is a risk of breakage due to chafing of the electrical cable during the sliding movement.

Meanwhile, in the present embodiment, the first connection mechanism 3 is slidably moved by the first slide portion 5 at the position relative to the base member, and is in the over-riding state of over-riding the upper surface of the base member 4. When the first connection mechanism 3 is in an over-riding state, the engagement portion 35 (an example of the connection part) performs a lifting operation to be connected with the connected part 101a. By the aforementioned configuration, it is possible to connect with the carriage 100 by adjusting the position relative to the base member without providing the lifting device in the first connection mechanism 3 to be slidably moved.

In the environment which uses the conveying device 1, various conditions are assumed, and it is possible to have a floor which is not flat. For example, the cases in which there are obstacles, steps and the like, and the sliding directly below the carriage 100 is hindered can be considered.

With respect, thereto, the conveyance method according to the embodiment of the present invention is a conveyance method for conveying a connected carriage 100 in the state in which the conveying device 1 slid between the bottom surface of the carriage 100 and the floor, and includes a guiding process for moving the conveying device 1 to a location where the conveying device 1 is connected with the carriage 100, a first connection process for connecting the first connection mechanism 3 provided on the upper surface of the conveying device 1 with the carriage 100 in the connection position, a sliding movement process for slidably moving the first connection mechanism 3 integrally with the carriage 100 in a state in which the first connection mechanism 3 is connected with the carriage 100, between the connection position and a conveyance position spaced away from the connection position on the slide axis SL, and a conveyance process for conveying the carriage 100 in a state of being connected in the conveyance position, to the conveying device 1. Therefore, it is possible to move and then convey the carriage 100 without the conveying device 1 sliding directly below the carriage 100 in advance, and without being influenced by the condition directly below the carriage 100.

FIG. 12A to FIG. 12D illustrate the operation for connecting the first connection mechanism 3 with the carriage 100 and conveying, but by reversing the aforementioned operation, the connection between the conveying device 1 and the carriage 100 can be released.

Second Embodiment

Next, the conveying device according to the second embodiment of the present invention will be explained with reference to the drawings. Note that, the configuration of the conveying device according to the second embodiment is substantially the same as the first embodiment, thus, an explanation and the drawings are omitted.

Figure 13A:
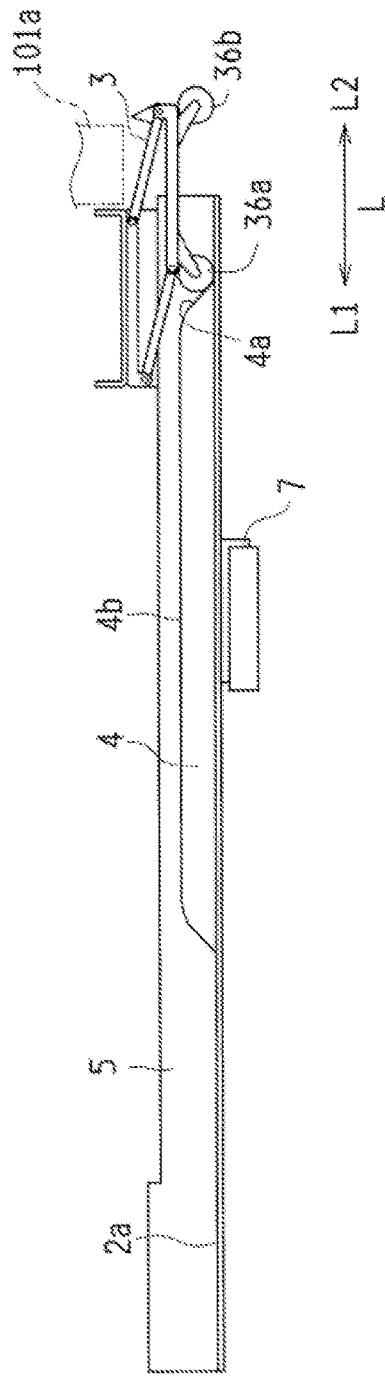
FIG. 13A is an explanatory view illustrating the state in which the first connection mechanism is positioned in the vicinity of the connected part in the conveying device according to the second embodiment of the present invention.
Figure 13B:
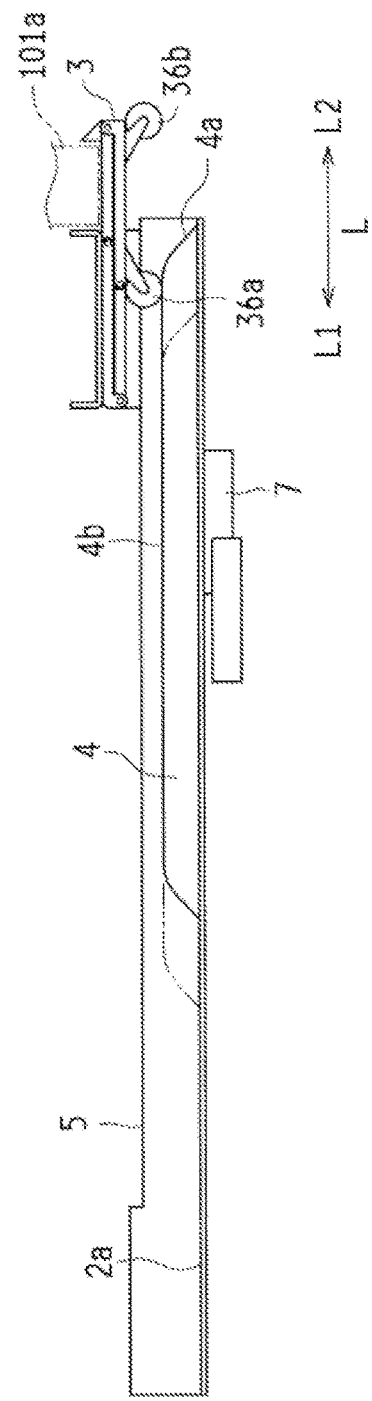
FIG. 13B is an explanatory view illustrating the state in which the first connection mechanism is connected with the connected part.

FIG. 13A is an explanatory view illustrating the state in which the first connection mechanism is positioned in the vicinity of the connected part in the conveying device according to the second embodiment of the present invention, and FIG. 13B is an explanatory view illustrating the state in which the first connection mechanism is connected with the connected part.

The second embodiment is different from the first embodiment in the point that the base member 4 is moved by the second slide portion 7. The second slide portion 7 is a cylinder, and moves the base member 4 provided on the upper portion in the longitudinal direction L. Note that, FIG. 13A is substantially the same as FIG. 12A, the first connection mechanism 3 faces the connected part 101a of the carriage 100, but the engagement portion 35 is lowered, and does not engage with the connected part 101a.

In FIG. 13B, the first connection mechanism 3 is moved to the over-riding state with respect to the state shown in FIG. 13A. The base member 4 is moved to the second longitudinal direction L2 relative to the first connection mechanism 3. Note that., the dashed line shown in FIG. 13B indicates the base member 4 prior to being moved in the second longitudinal direction L2. In FIG. 13B, in the same manner as FIG. 129, the first over-riding wheel 36a is pushed to the base member 4, and the engagement portion 35 is raised to connect with the connected part 101a.

After the engagement portion 35 is connected with the connected part 101a, the carriage 100 moves by maintaining over-riding state and slidably moving the first connection mechanism 3 as shown in FIG. 12C. In this case, the position of the base member 4 may be appropriately adjusted by the second slide portion 7.

As stated above, by constituting the first connection mechanism 3 and the base member 4 to move independently, the engagement portion 35 can be raised and lowered without changing the position of the travel casing 2.

Further, in a modification example of the second embodiment of the conveying device 1 according to the present invention, the conveyance method for conveying the carriage 100 may be carried out under different conditions.

In the modification example, the sliding movement of the first slide portion 5 is not performed, and the first connection mechanism 3 is fixed in the vicinity of the end of the conveying device 1. Moreover, the first connection mechanism 3 moves the base member 4 to raise and lower the engagement portion 35 as shown in FIG. 13A and FIG. 13B. As shown in FIG. 10, the conveying device 1 is made to travel by the traveling mechanism and conveys the carriage 100 in a state in which the conveying device 1 is connected with the carriage 100 by the first connection mechanism 3 positioned in the vicinity of the end of the conveying device 1. As stated above, the present invention may be configured so that, the position of the first connection mechanism 3 relative to the base member 4 may be slidably moved relative to the slide axis SL, and only the base member 4 may be moved.

Third Embodiment

Next, the conveying device according to the third embodiment of the present invention will be explained with reference to the drawings. Note that, the configuration of the conveying device according to the third embodiment is substantially the same as the first embodiment and the second embodiment, thus, an explanation and the drawings are omitted.

Figure 14A:
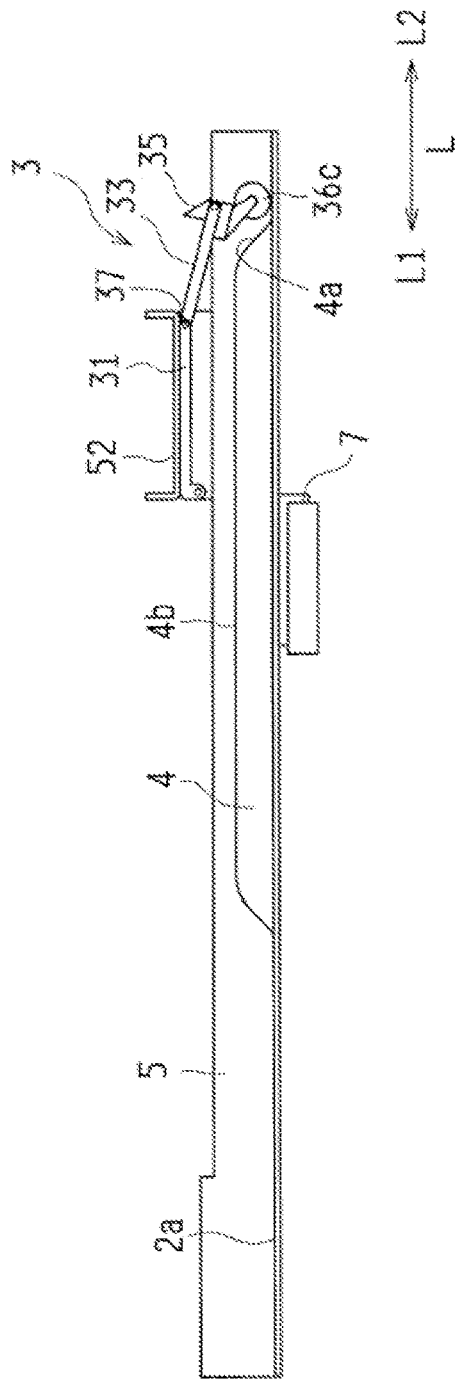
FIG. 14A is an explanatory view illustrating the state in which the first connection mechanism is positioned in the vicinity of the connected part in the conveying device according to a third embodiment of the present invention.
Figure 14B:
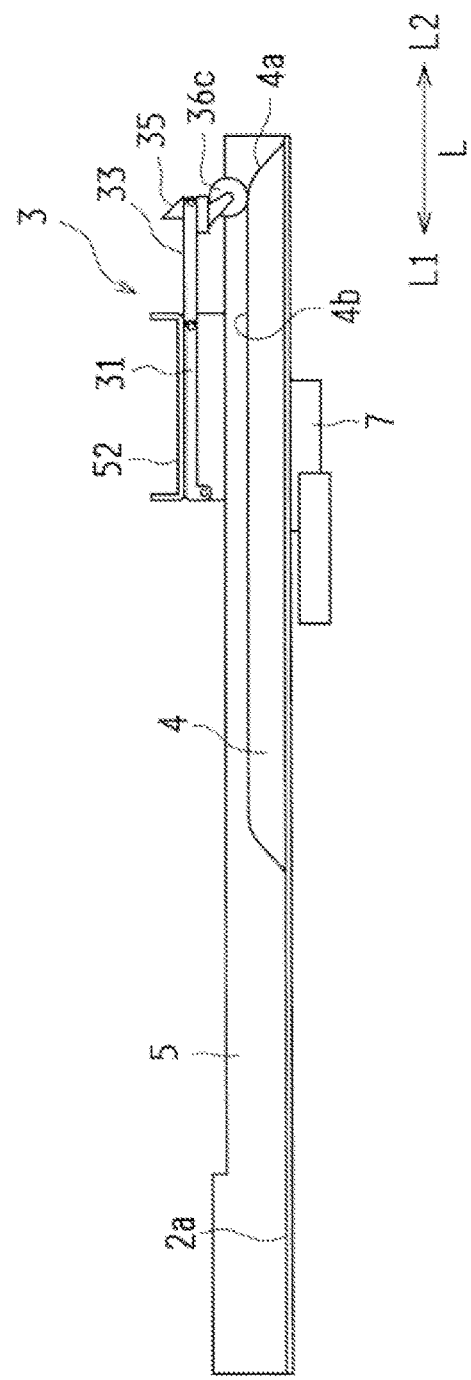
FIG. 14B is an explanatory view illustrating the state in which the first connection mechanism in the connection position is connected with the connected part.

FIG. 14A is an explanatory view illustrating the state in which the first connection mechanism is positioned in the vicinity of the connected part in the conveying device according to a third embodiment of the present invention, and FIG. 14B is an explanatory view illustrating the state in which the first connection mechanism in the connection position is connected with the connected part.

In the third embodiment, the configuration of the first connection mechanism 3 is different than the first embodiment. Specifically, in the present embodiment, the first connection mechanism 3 is constituted by the first opposing piece 31, the first rotating piece 33, the engagement portion 35, and the third over-riding wheel 36c. The first opposing piece 31 is fixed to the lower surface of the second connecting passage part 52, and one end thereof (on the second side surface 2c side) is connected with the first rotating piece 33. The first rotating piece 33 rotates around the fulcrum 37 connected with the first opposing piece 31, and the engagement portion 35 is provided on the upper surface of the end opposite to the fulcrum 37. Further, the third over-riding wheel 36c (an example of the over-riding portion) is provided in the first rotating piece 33 below the engagement portion 35. The engagement portion 35 is configured to be raised and lowered in accordance with the height (position) of the third over-riding wheel 36c. In the present embodiment, the first connection mechanism 3 may set the position where the third over-riding wheel 36c is contact with the reference surface 2a as the range of movement, and the position of the conveying device 1 relative to the carriage 100 may be adjusted in the guiding process.

FIG. 14A, the first connection mechanism 3 is positioned in the vicinity of the second side surface 2c (in FIG. 14A, the right end), and is a lower state in which the lower portion (specifically, the third over-riding wheel 36c) abuts against the reference surface 2a.

In FIG. 14B, the base member 4 moves in the second longitudinal direction L2 with respect to the state shown in FIG. 14A, and the first connection mechanism 3 is moved to the over-riding state. The third over-riding Wheel 36c is pushed to the base member 4, and the engagement portion 35 is raised to connect with the connected part 101a.

FIG. 14A and FIG. 14B illustrate the operation for moving the base member 4 to raise and lower the engagement portion 35, but the first connection mechanism 3 may move relative to the base member 4 to raise and lower the engagement portion 35.

Fourth Embodiment

Next, the fourth embodiment of the conveying device according to the present invention will be explained with reference to the drawings. Note that, the portions of the configuration of the conveying device according to the fourth embodiment which are substantially the same as the first embodiment to the third embodiment are given the same reference numerals and are omitted from the description and the drawings.

Figure 15:
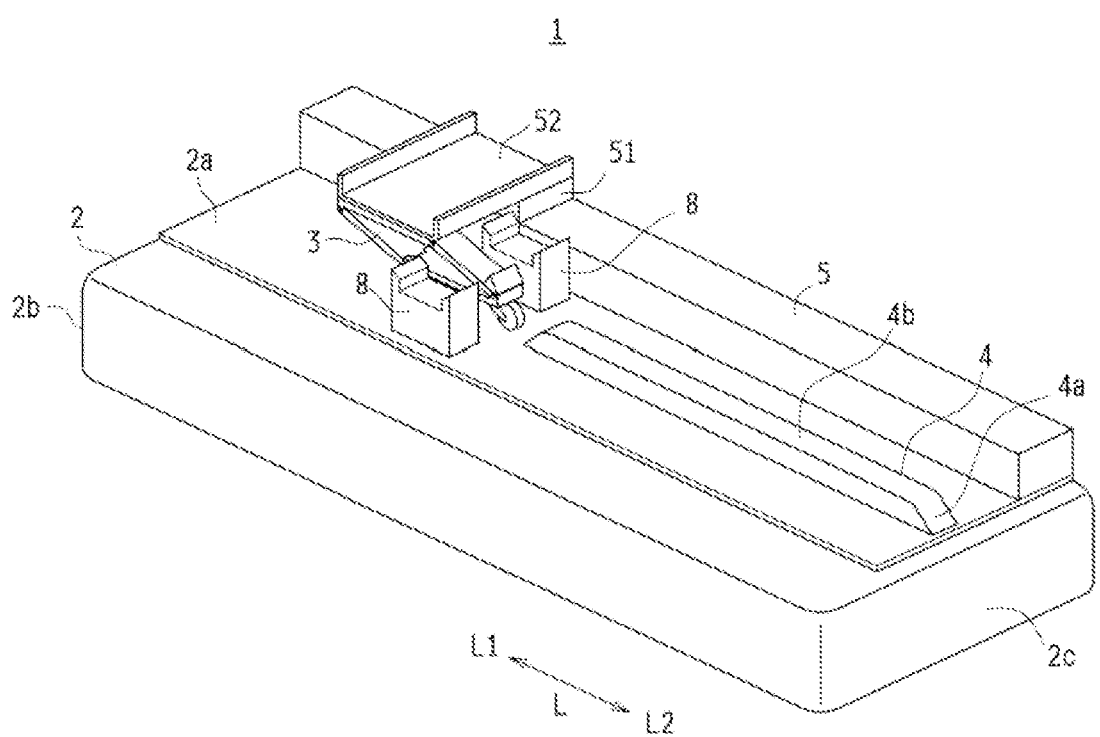
FIG. 15 is a schematic perspective view of the conveying device according to a fourth embodiment of the present invention.
Figure 16:
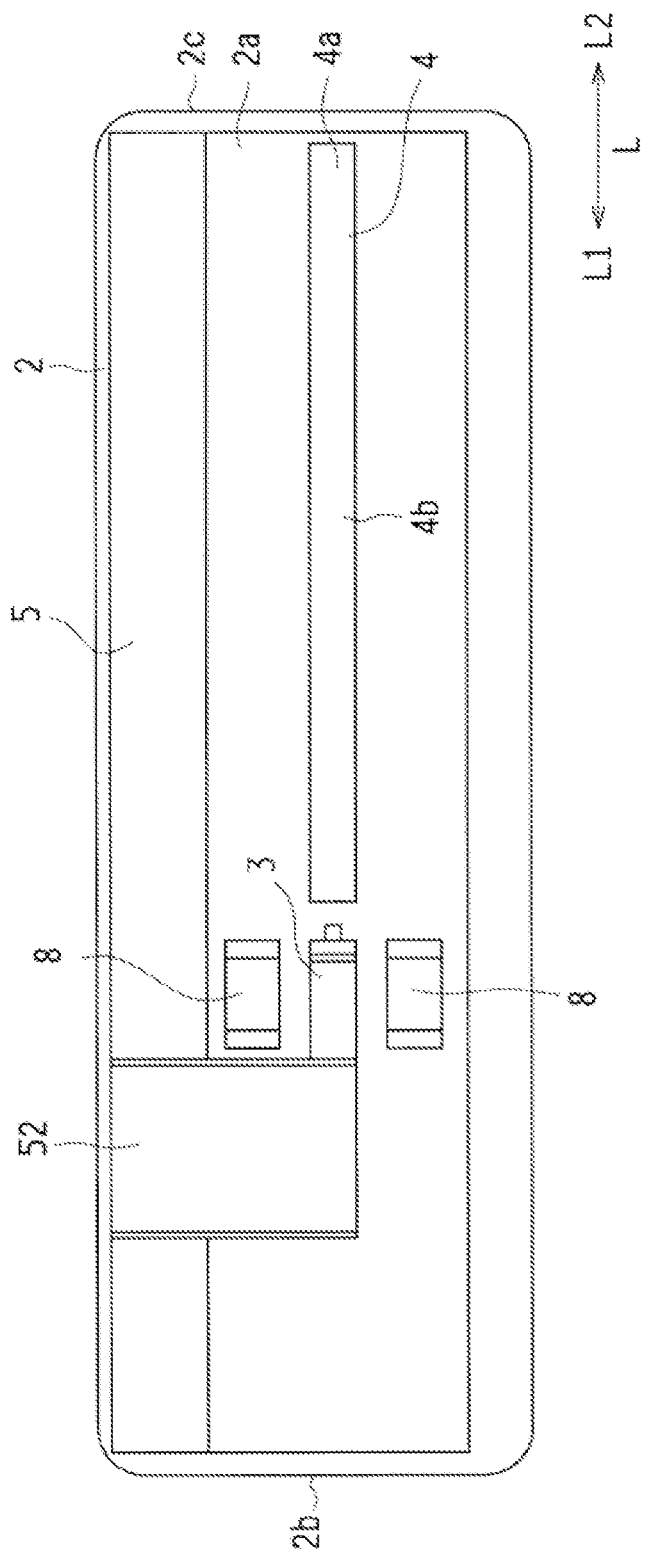
FIG. 16 is a schematic upper surface view of the conveying device shown in FIG. 15.

FIG. 15 is a schematic perspective view of the conveying device according to a fourth embodiment of the present invention, and FIG. 16 is a schematic upper surface view of the conveying device shown in FIG. 15.

The fourth embodiment is different from the first embodiment in the point that a second connection mechanism 8 is provided. The second connection mechanism 8 is provided protruding upward relative to the reference surface 2a, and is provided closer to the first side surface 2b than the center of the upper surface of the conveying device 1. Specifically, the second connection mechanism 8 is positioned in the vicinity of the end of the first longitudinal direction L1 side in the range of movement of the first connection mechanism 3. The second connection mechanism 8 is provided at two places separated from the first connection mechanism 3 in the lateral direction orthogonal to the slide axis SL in a state viewed from the upper surface (refer to FIG. 16). In the present embodiment, two second connection mechanisms 8 are provided in a pair of linearly symmetric positions with respect to the slide axis SL, and are positioned so as to sandwich the first connection mechanism 3 between the two second connection mechanisms 8. Next, the detailed configuration of the second connection mechanism 8 will be described with reference to FIG. 17A and FIG. 17B.

Figure 17A:
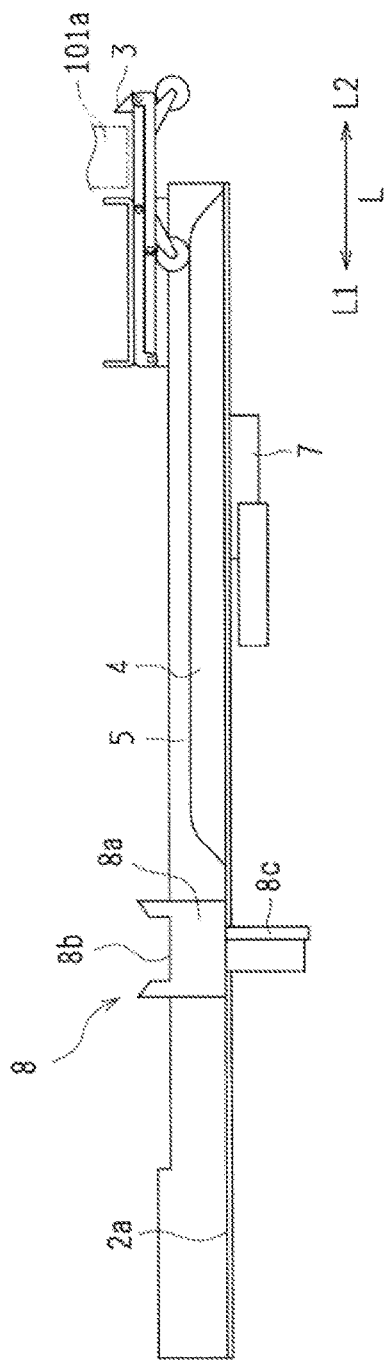
FIG. 17A is an explanatory view illustrating the state in which a lifting part of the second connection mechanism is lowered.
Figure 17B:
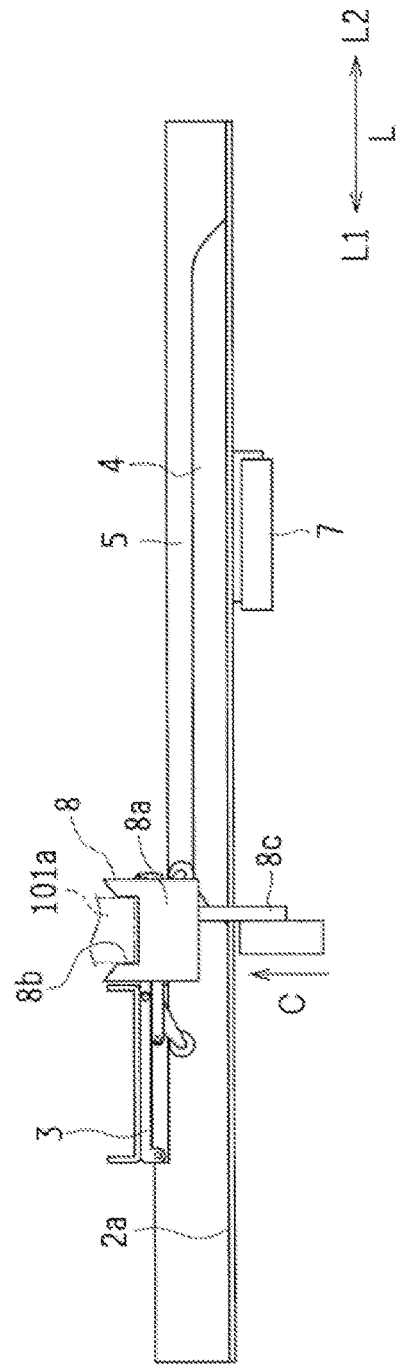
FIG. 17B is an explanatory view illustrating the state in which the lifting part of the second connection mechanism is raised.

FIG. 17A is an explanatory view illustrating the state in which a lifting part of the second connection mechanism is lowered, FIG. 17B is an explanatory view illustrating the state in which the lifting part of the second connection mechanism is raised.

The second connection mechanism 8 includes a lifting part 8c for raising and lowering relative to the reference surface 2a, and a lifting connection part 8a fixed to the lifting part 8c. Specifically, the lifting part 8c is a cylinder, and raises and lowers the lifting connection part 8a attached to the upper portion. The lifting connection part 8a is provided with a recess 8b in the upper surface. The recess 8b may be formed in accordance with the connected part 101a, and is configured so that the connected part 101a is fitted in the recess 8b.

In FIG. 17A, as in FIG. 14B, the first connection mechanism 3 in the connection position is connected with the connected part 101a. From this state, the first connection mechanism 3 slidably moves the connected part 101a in the first longitudinal direction L1 to the position facing the second connection mechanism 8. When the first connection mechanism 3 slidably moves, the second connection mechanism 8 is lowered, and the height of the upper surface is set so as to not contact with the connected part 101a.

In FIG. 17B, as in FIG. 12D, the first connection mechanism 3 connect with the connected part 101a is positioned in the conveyance position. In the second connection process, by the lifting part 8c rising (in FIG. 17B, the direction of arrow C) the lifting connection part 8a engages with the connected part 101a, and the second connection mechanism 8 is connected with the connected part 101a.

Figure 18:
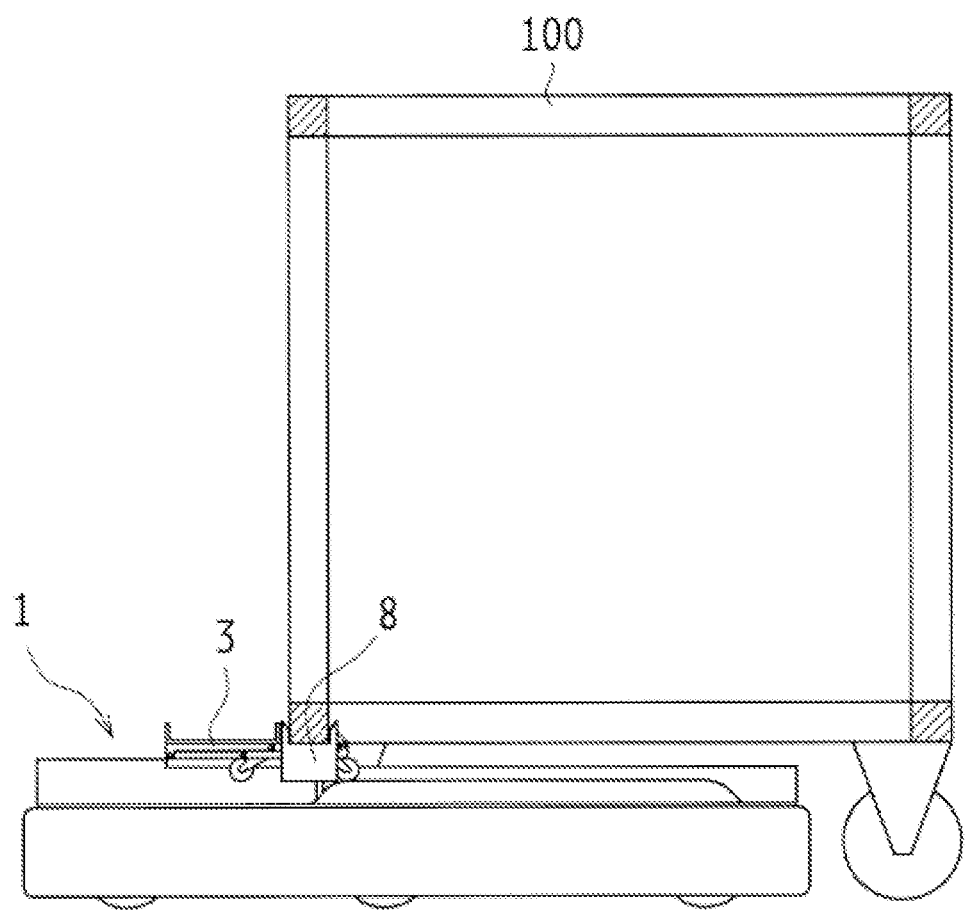
FIG. 18 is an explanatory view illustrating the state in which the second connection mechanism is connected with the carriage.

FIG. 18 is an explanatory view illustrating the state in which the second connection mechanism is connected with the carriage.

The second connection mechanism 8 is connected with the connected part 101a in a state in which the center of the conveying device 1 is positioned within the area directly below the bottom surface of the carriage 100 as shown in FIG. 17B. The second connection mechanism 8 is set to have a higher toughness to the load when towing the carriage 100 than the first connection mechanism 3. In short, the connected part 101a becomes stuck by the rotatable first rotating piece 33 in the first connection mechanism 3, thus, structurally weak portions such as the contact points of each member are present. The second connection mechanism 8, on the other hand, has a simple structure to only operate with the lifting part 8c, and thus, can be formed stronger than the first connection mechanism 3. Therefore, by sharing the role of towing the carriage 100 and the role of holding the carriage 100 between the first connection mechanism 3 and the second connection mechanism 8, the structural vulnerabilities can be covered. FIG. 18 illustrates the state in which both of the first connection mechanism 3 and the second connection mechanism 8 are connected with the connected part 101a, but it is not limited thereto, and only the second connection mechanism 8 may be connected with the connected part 101a when the conveying device 1 travels to convey the carriage 100.

Note that, the present invention can be reduced to practice in various other forms without departing from its spirit or essential features. Therefore, the above-described exemplary embodiments are to all intents and purposes merely illustrative and should not be construed as limiting. Further, all variations within the meaning and range of equivalency of the claims fall within the scope of the present invention.

What is claimed is:

1. A conveying device that conveys a connected object to be conveyed, the conveying device comprising:
   a first connection mechanism provided on an upper surface of the conveying device;
   a base member provided on the upper surface of the conveying device;
   a sliding mechanism that relatively and slidably moves a position of the first connection mechanism relative to the base member on a predetermined slide axis; and
   a traveling mechanism that makes the conveying device travel, wherein the first connection mechanism has:
   an over-riding portion provided on the slide axis; and
   a connection part connected with the object to be conveyed,
   the over-riding portion is in an over-riding state of over-riding an upper surface of the base member when the sliding mechanism slidably moves the position of the first connection mechanism relative to the base member, and
   the connection part performs a lifting operation to be connected with the object to be conveyed when the over-riding portion is in the over-riding state.

2. The conveying device according to claim 1, wherein the base member has a guide portion having a tapered shape, at an end of a side facing the over-riding portion on the slide axis.

3. The conveying device according to claim 1, wherein the base member has a sliding portion having a flat shape in a center portion, on the slide axis, of the upper surface.

4. The conveying device according to claim 1, wherein the sliding mechanism includes a first slide portion that slidably moves the first connection mechanism on the slide axis.

5. The conveying device according to claim 4, wherein the first connection mechanism is connected with the object to be conveyed at a predetermined connection position, and
the first slide portion slidably moves the first connection mechanism between the connection position and a conveyance position spaced away from the connection position on the slide axis, in a state in which the first connection mechanism is connected with the object to be conveyed.

6. The conveying device according to claim 5, wherein the traveling mechanism makes the conveying device travel in a state in which the first connection mechanism is positioned in the conveyance position.

7. The conveying device according to claim 5, wherein when the first connection mechanism is positioned in the connection position, the center of the conveying device is positioned outside an area directly below a bottom surface of the object to be conveyed, and
when the first connection mechanism is positioned in the conveyance position, the center of the conveying device is positioned within the area directly below the bottom surface of the object to be conveyed.

8. The conveying device according to claim 5, further comprising a second connection mechanism connected with the object to be conveyed in a state in which the first connection mechanism is positioned in the conveyance position.

9. The conveying device according to claim 1, wherein the sliding mechanism includes a second slide portion that slidably moves the base member on the slide axis.

10. The conveying device according to claim 9, wherein the over-riding portion over-rides the upper surface of the base member when the base member is slidably moved on the slide axis.

11. The conveying device according to claim 1, wherein the over-riding portion has a friction reduction mechanism that reduces friction between the over-riding portion and the upper surface of the base member when over-riding the upper surface of the base member.

12. The conveying device according to claim 1, wherein the connection part includes a rotating portion which rotates around a fulcrum, and an engagement portion provided spaced away from the rotating portion and protruding upward, and the rotating portion rotates upward and engages the engagement portion with a part of a bottom surface of the object to be conveyed when the over-riding portion over-rides the upper surface of the base member.

\* \* \* \* \*